United States Patent [19]
Boss et al.

[11] Patent Number: 6,157,618
[45] Date of Patent: Dec. 5, 2000

[54] DISTRIBUTED INTERNET USER EXPERIENCE MONITORING SYSTEM

[75] Inventors: Jerome D. Boss, Bellevue; Cezary Marcjan, Redmond; Fei Su, Bellevue, all of Wash.

[73] Assignee: Microsoft Corporation, Redmond, Wash.

[21] Appl. No.: 09/237,538

[22] Filed: Jan. 26, 1999

[51] Int. Cl.[7] ............................ G01R 31/08; H04L 12/28; H04M 1/24
[52] U.S. Cl. ........................... 370/252; 370/400; 379/34; 709/224
[58] Field of Search ..................................... 370/352, 354, 370/355, 356, 400, 401, 252; 379/32, 34; 705/36, 39, 79; 709/203, 219, 224; 714/101, 712

[56] References Cited

U.S. PATENT DOCUMENTS

| | | | |
|---|---|---|---|
| 5,726,984 | 3/1998 | Kubler et al. | 370/349 |
| 5,931,917 | 8/1999 | Nguyen et al. | 709/250 |
| 6,047,322 | 4/2000 | Vaid et al. | 709/224 |

OTHER PUBLICATIONS

"ISAPI Server Extensions and Filters" document, a copy of which is available on Microsoft Corporation's website. http://premium.microsoft.com, 2 pages (Dec. 17, 1998).

"Development ISAPI Extensions" document, a copy of whichis available on Microsoft Corporation's website, http://premium.microsoft.com, 1 page (Dec. 17, 1998).

"Keynote Systems: Products" document, a copy of which is available on the Keynote Systems, Inc., website, www.keynote.com, 14 pages (Nov. 1998).

"Inverse Network Technology: Products" document, a copy of which is available on the inverse Network Technology, Inc., website, www.keynote.com, 15 pages (Nov. 1998).

"IWebBrowser2" Interface specificatiuon, a copy of which is available on Micorsoft Corporation's main web site, www-.microsoft.com, under the link "developer resources," 2 pages (Dec. 21, 1998).

*Primary Examiner*—Hassan Kizou
*Assistant Examiner*—John Pezzlo
*Attorney, Agent, or Firm*—Woodcock Washburn Kurtz Mackiewicz & Norris LLP

[57] ABSTRACT

Geographically distributed data-gathering client computers are connected to the Internet in the same manner as typical users (for example, via local dial-up connections). The data-gathering client computers poll a central server (the "UserMon" server) for a target site to access. After receiving the address of a target site from the UserMon server, the data-gathering client computers access the target site and obtain performance-parameter values indicative of the quality of their respective Internet connections to the target site and/or the performance of the target site itself. Each data-gathering client computer then pushes the performance-parameter values back to the "UserMon" server for analysis.

27 Claims, 9 Drawing Sheets

700

701 RAS FILE:
| ISP LOC | ISP NAME | ISP NUM | DOMAIN NAME | USER NAME | PASSWORD |
|---|---|---|---|---|---|
| ISP LOC | ISP NAME | ISP NUM | DOMAIN NAME | USER NAME | PASSWORD |
| ISP LOC | ISP NAME | ISP NUM | DOMAIN NAME | USER NAME | PASSWORD |
| ISP LOC | ISP NAME | ISP NUM | DOMAIN NAME | USER NAME | PASSWORD |
| 704 | 705 | 706 | 707 | 708 | 709 |

702 URL FILE:
| TARGET PAGE NAME | URL PREFIX | URL SUFFIX | OPT | OPT |
|---|---|---|---|---|
| TARGET PAGE NAME | URL PREFIX | URL SUFFIX | OPT | OPT |
| TARGET PAGE NAME | URL PREFIX | URL SUFFIX | OPT | OPT |
| TARGET PAGE NAME | URL PREFIX | URL SUFFIX | OPT | OPT |
| 710 | 711 | 712 | 713 | 714 |

703 QRY FILE:
STRING
STRING
STRING
STRING
715

FIG. 7

DISTRIBUTED INTERNET USER EXPERIENCE MONITORING SYSTEM

BACKGROUND INFORMATION

FIG. 1 (Prior Art) is a diagram of an exemplary Internet structure 100. Internet structure 100 includes numerous servers 101–110 (each designated with an "S") interconnected by high-speed connections 111–119. The high-speed connections are of several different types: for example, connection 113 is a T1 connection, connection 115 is a high-speed fiber-optic connection, part of the so-called "backbone" of the Internet, and connection 118 is a lower-speed ISDN connection. Internet structure 100 also includes numerous clients (each designated with a "C") connected to the servers. Most of the clients are connected to the Internet via an Internet Service Provider, or "ISP." For example, client 120 is connected to the Internet via ISP1 server 101.

ISPs maintain servers on the Internet and sell Internet access to individual subscribing clients. A subscribing client typically gains access to the Internet using a modem to call the ISP. The client typically dials a local telephone phone number to establish a connection to the Internet via the ISP by connecting to the ISP's point of presence (POP). A local area network (LAN) of clients can also be connected to the Internet, either via a dial-up connection or a permanent connection. For example, LAN 123 is connected to the Internet via one of the nodes 104 on LAN 123 that happens to be a server.

In the example, server 110 is the server of a large bookstore that advertises and sells books over the Internet, for example by maintaining a web site. The customers of the bookstore access the Internet as clients 120–122. Customer clients 120 and 122 may, for example, be individuals who buy books and access the Internet from their respective homes in California and New York. The bookstore server 110 may, for example, be located in Illinois.

Companies that advertise on the Internet recognize the importance of providing customers and potential customers with a pleasurable shopping or browsing experience. On the Internet, a pleasurable experience generally requires that users can easily establish and maintain fast, reliable connections, and that the various elements of the site are available. Users may have negative experiences when connecting to a web site using particular ISPs or local dial-up connections. These negative experiences can result in low sales figures in some areas. For example, potential customers in San Francisco may have difficulty accessing bookstore 110 due to local Internet infrastructure limitations. Companies that advertise on the Internet therefore spend large sums of money trying to determine whether customers and potential customers in various parts of the world can easily access, explore, and interact with company web sites.

FIG. 2 (Prior Art) is a diagram of an Internet structure 200 in which a client 124 provides a measure of user experience for specified Internet sites. Client 124 monitors the quality of Internet connections to Internet sites and sells the gathered information to companies that advertise on the Internet.

Client 124 dials out from a single location and accesses a target Internet site (for example, bookstore server 110) via a number of ISPs 101, 103 and 109. Client 124 then records performance data indicative of the quality of connections to the target site. Unfortunately, the different lengths of the long-distance connections 124A, 124B and 1245C from the single location of client 124 to the various ISPs 101, 103 and 109 affects connection quality. In contrast, the customers 120, 121 and 122 of the bookstore are connected to ISPs via local dial-up telephone connections 120A, 121A and 122A. The performance data collected by client 124 at the single location is therefore not necessarily representative of a typical user's experience.

FIG. 3 (Prior Art) is a simplified diagram of an Internet structure 300 in which a "distributed" system of data-gathering computers 125–127 provides a measure of user experience for specified Internet sites. The data-gathering computers 125–127 are linked to the Internet at various geographically separated locations via dedicated connections 128–130 (not dial-up connections). The performance data collected is not representative of a typical user's experience for at least two reasons. First, the data-gathering computers are connected to the Internet via dedicated connections rather than dial-up connections. Second, the software used to access the target site is different than the commercially available browser software used by typical users. Moreover, the systems of FIGS. 2 and 3 do not measure some performance characteristics that are useful in assessing user experience; for example, neither system measures the time required for a user to download a given web page.

SUMMARY

The invention involves a method that employs a system of geographically distributed data-gathering client computers that connect to the Internet, access a particular target site, and obtain performance-parameter values indicative of the quality of their respective connections to the target site and the targeted web site. The data-gathering client computers connect to the Internet in the same manner as typical users (for example, to an ISP via a local dial-up connection). Moreover, the application software used by the data-gathering client computers to access the target site is similar to that used by a typical user. The performance-parameter values obtained are therefore indicative of the experience of a typical user accessing the target site for at least two reasons (plus the one we marked above). Each data-gathering client computer, having obtained the performance-parameter values associated with its respective connection to the target site and the parameters associated to the web site measured, forwards the performance-parameter values to a central server (the "UserMon" server) for analysis.

A "distributed push" scheme is employed in one implementation. The many data-gathering client computers first poll the UserMon server for instructions (e.g., which target site to access). The individual data-gathering client computers then access the target site specified by the UserMon server(s), gather performance-parameter values, and then "push" the acquired performance-parameter values back to the UserMon server(s) for analysis.

This summary does not purport to define the invention. The invention is defined by the claims.

BRIEF DESCRIPTION OF THE DRAWINGS

FIG. 7 is a diagram that illustrates information in the instruction files for a data-gathering client in accordance with the present invention.

DETAILED DESCRIPTION

Figure 1:
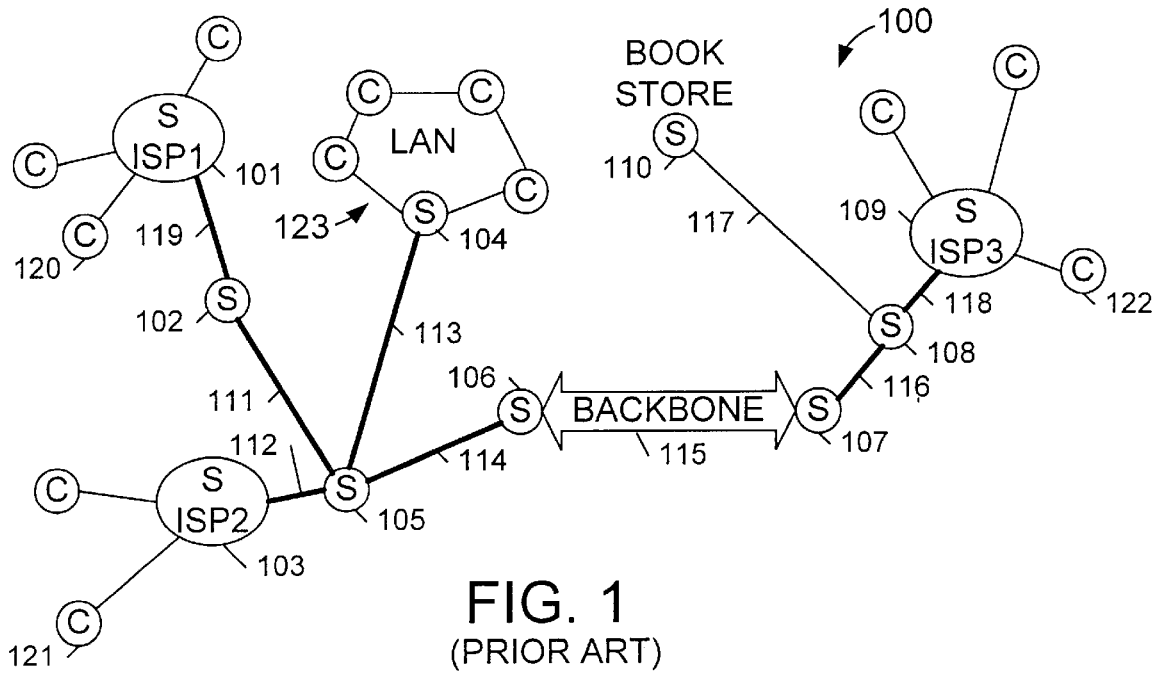
FIG. 1 (Prior Art) is a diagram of an exemplary Internet structure 100.
Figure 2:
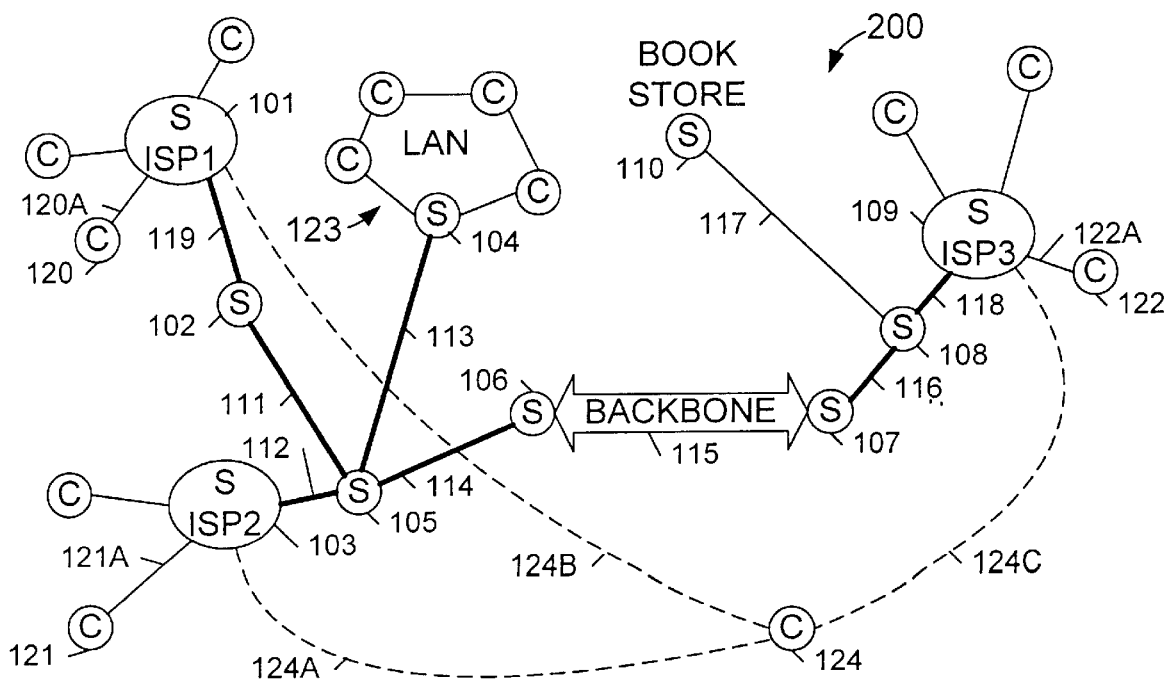
FIG. 2 (Prior Art) is a simplified diagram of a first prior art system that monitors the quality of Internet connections.
Figure 3:
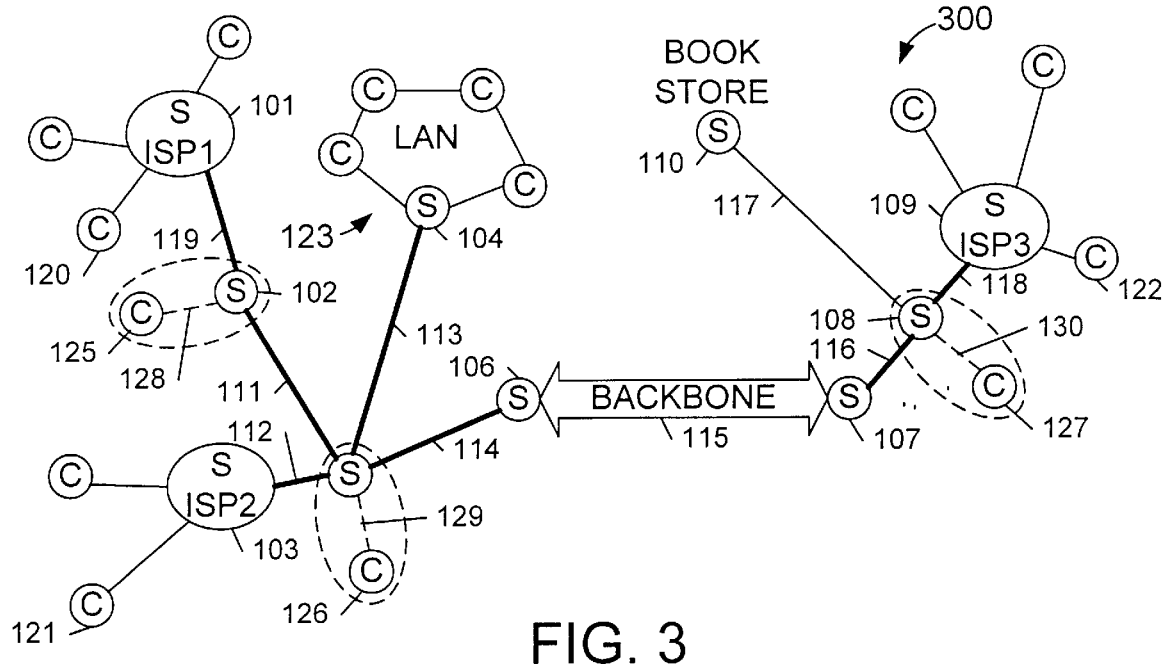
FIG. 3 (Prior Art) is a simplified diagram of a second prior art system that monitors the quality of Internet connections.
Figure 4:
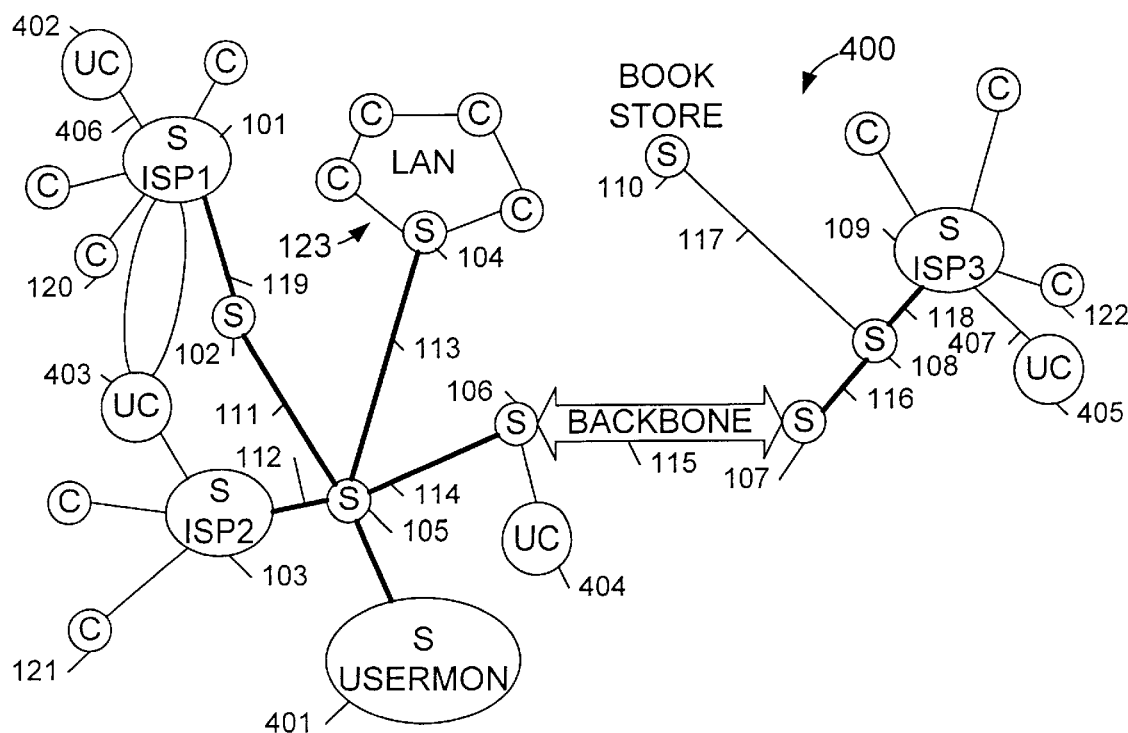
FIG. 4 is a simplified diagram of a system in accordance with the present invention.

FIG. 4 is a simplified diagram of a system 400 that monitors the performance of Internet connections in accordance with the present invention. The overall performance of an Internet connection typically entails: the performance of a connection from a client to an Internet service provider (ISP), the performance of a connection from the ISP to a target web site, and the performance of the target site itself.

System 400 is a "distributed" system employing a number of data-gathering clients 402–405 connected to the Internet via local (i.e., not long distance) dial-up telephone connections. The system is called a "distributed" system because the data-gathering clients are distributed among a number of geographical locations. The system also involves a user-experience monitoring system server(s) 401, also called the "UserMon" server, that contains instructions to data-gathering clients 402 and 405 and receives data from data-gathering clients 402 and 405. As described below in detail, the data-gathering clients collect data indicative of user experiences from a number of locations using different connections. This collection of user-experience data may then be used to identify a variety of problems that degrade user experience.

Figure 5:
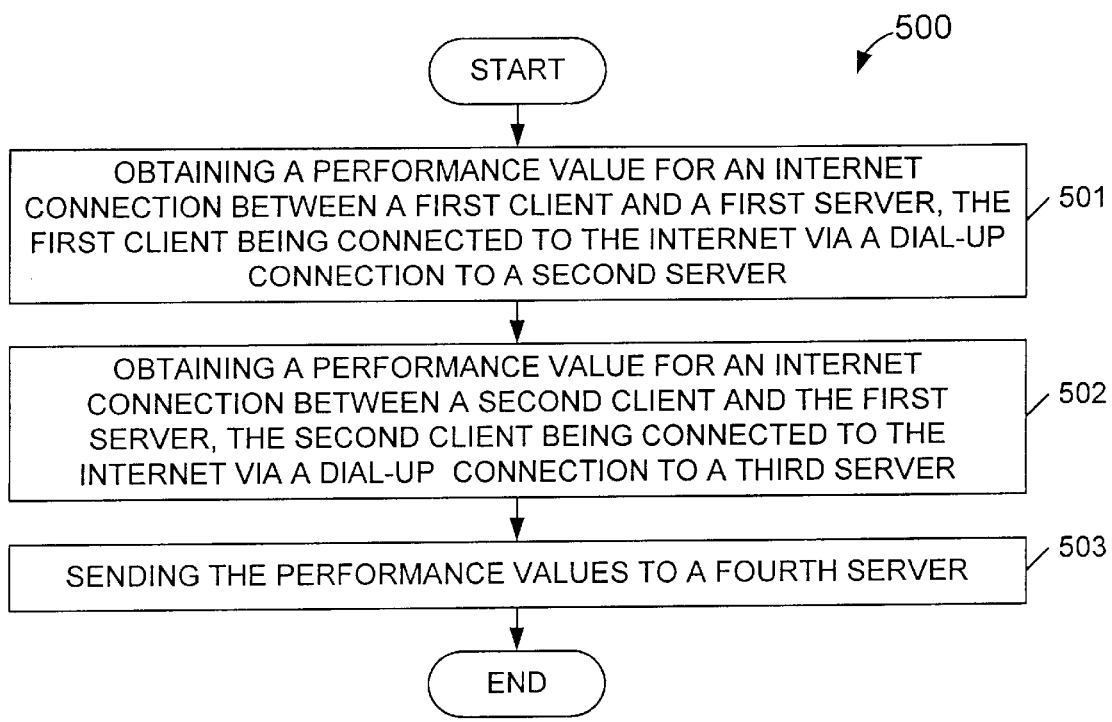
FIG. 5 is a flowchart of a method in accordance with FIG. 4.

FIG. 5 is a diagram of a method 500 in accordance with FIG. 4. In step 501, a first Internet connection is established from a first data-gathering client 402 to a selected first server 110. In some embodiments, this first Internet connection includes a dial-up connection 406 from the first data-gathering client 402 to a POP and another connection from the POP to ISP1. This POP may be in a POP facility that contains banks of modems and servers with network connections.

First data-gathering client 402 monitors the Internet connection and obtains a performance-parameter value indicative of what a first user's experience would be if the first user were to attempt to access the first server 110 from first data-gathering client 402. For example, first data-gathering client 402 may access a target web site on ISP server 110, download the web page, record the time (i.e., full-page download time) required to download the web page.

In step 502, a second Internet connection is established from a second data-gathering client 405 to the same first server 110 (the target site). This second Internet connection includes a dial-up connection 407 from second data-gathering client 405 to a third ISP server 109 (via a POP) and another connection from third ISP server 109 to the first server 110. Second data-gathering client 405 monitors the second Internet connection and obtains a performance value indicative of what a second user's experience would be if the second user were to attempt to access the first server 110 from second client 405.

In step 503, the performance-parameter values obtained by the first and second data-gathering clients 402 and 405 are sent to a fourth server 401, the "UserMon server." The performance values thus collected at the UserMon server can then be used to determine what a user's experience accessing a target web page on first server 110 would be for users accessing the target web page from various geographic locations. For illustrative purposes, first server 110 includes the entire target web page. However, the information making up the target web page may, in some embodiments, reside on more than one server.

In some embodiments, the first client 402 is geographically disposed in a first local telephone market area (an area in which the telephones have a first area code) and the second client 405 is geographically disposed in a second local telephone market area (an area in which the telephones have a second area code and do not have the first area code). The first and second clients 402 and 405 may be separated from one another by a large distance, for example a distance greater than 500 miles.

Figure 6:
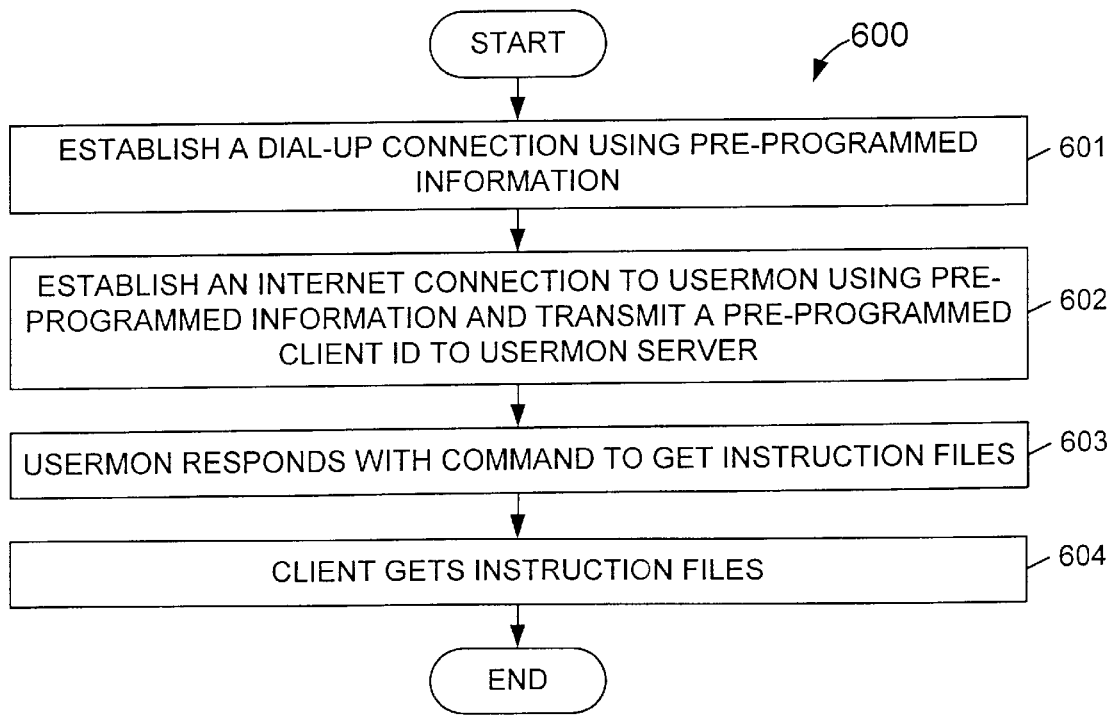
FIG. 6 is a flowchart of a method of installing a data-gathering client in accordance with the present invention.

FIG. 6 is a flowchart of a method 600 of installing one of the data-gathering clients 402–405. Each data-gathering client is preprogrammed with information necessary to make an initial Internet connection to the UserMon server. This information includes a list of ISP dial-up telephone numbers, ISP account usernames, ISP account passwords, a client ID of the data-gathering client, DNS settings, cookies, modem settings, and settings for accessing UserMon server 401. The settings may be, for example, the Uniform Resource Locator (URL) of UserMon servier 401 or the IP address of User-Mon server 401.

In step 601, a data-gathering client (such as client 402 of FIG. 4) attempts to establish a dial-up connection to a predetermined ISP server (for example, ISP3) using the preprogrammed information. This dial-up connection may entail a dial-up connection to a POP as well as a connection from the POP to the ISP server itself. If the data-gathering client is unable to establish a dial-up connection with the first number in the list of ISP dial-up telephone numbers, then it tries again, using the next number on the list, until a dial-up connection is made. If all the numbers in the list of ISP dial-up telephone numbers have been tried without success, processing may return to the top of the list to try the numbers in the list again until a dial-up connection is made.

Next, in step 602, the data-gathering client uses the preprogrammed settings (for example, URL or IP address) to transmit its preprogrammed client ID to UserMon server 401. At this point, the data-gathering client has not been instructed to monitor Internet connection performance. Consequently, the data-gathering client does not record data indicative of the performance of the Internet connection to the UserMon server. ISP3, through which the data-gathering client is connected to the Internet, is one of a few ISP servers chosen to establish initial communication with the UserMon server. The dial-up connection may be over a long distance telephone connection. In some embodiments, it is preprogrammed with an initial set of target web site addresses. The data-gathering client then uses these addresses in the event that it cannot immediately pull target web site addresses from the UserMon server.

In step 603, UserMon server 401 responds by instructing data-gathering client 402 to get client-specific instruction files from the UserMon server. An instruction file contains a list of target sites and lists of ISP dial-up information as well as potential commands to execute. The data-gathering client retrieves the instruction files from the UserMon server and then disconnects from ISP3 (step 604). The information in the instruction files need not be stored in a file in all embodiments, but rather may be stored any suitable format.

In the instruction files, the target sites are listed as URLs of target web pages. The dial-up information includes ISP telephone numbers to be used in accessing those target sites and any usernames, passwords and/or domain names required to establish a connection to each listed ISP. The instruction files may also include a list of query strings. A query string is used to build an URL in the case where the target site is the site of search engine. In one embodiment, the data-gathering client retrieves the instruction files by executing an HTTP GET procedure in accordance with the WinInet application programming interface (API) using the UserMon URL in accordance with the hypertext transfer protocol (HTTP). Having retrieved the instruction files, the data-gathering client is prepared to begin accessing target sites to collect data indicative of user experience.

FIG. 7 is a diagram of information in the instruction files 700 for a data-gathering client. In one specific embodiment, there are three instruction files: a remote access server (RAS) file 701, a uniform resource locator (URL) file 702, and a query (QRY) file 703. Each line of RAS file 701 has the following fields separated by spaces: ISP location 704, ISP name 705, ISP telephone number 706, network domain name 707, user name 708, and user password 709. The line may also include the following additional fields: backup ISP telephone number, DNS server information specific to the ISP, and modem settings (AT commands). An asterisk is inserted into any non-applicable field.

Each line of URL file 702 has the following fields separated by spaces: target page name 710, URL prefix 711, URL suffix or full URL 712, an optional field 713 for a "must" string, and an optional field 714 for a "fail" string. The line may also include the following additional fields: DNS timeout value, full page download timeout value, script download timeout value, cookie string, "must" string, and a "fail" string. A "must" string is a text string that must be present on the target web page in order for the query to succeed. A "fail" string is a text string which if present on the target web page will cause the query to fail. Each line of the QRY file 703 is a separate query string 715.

Figure 8:
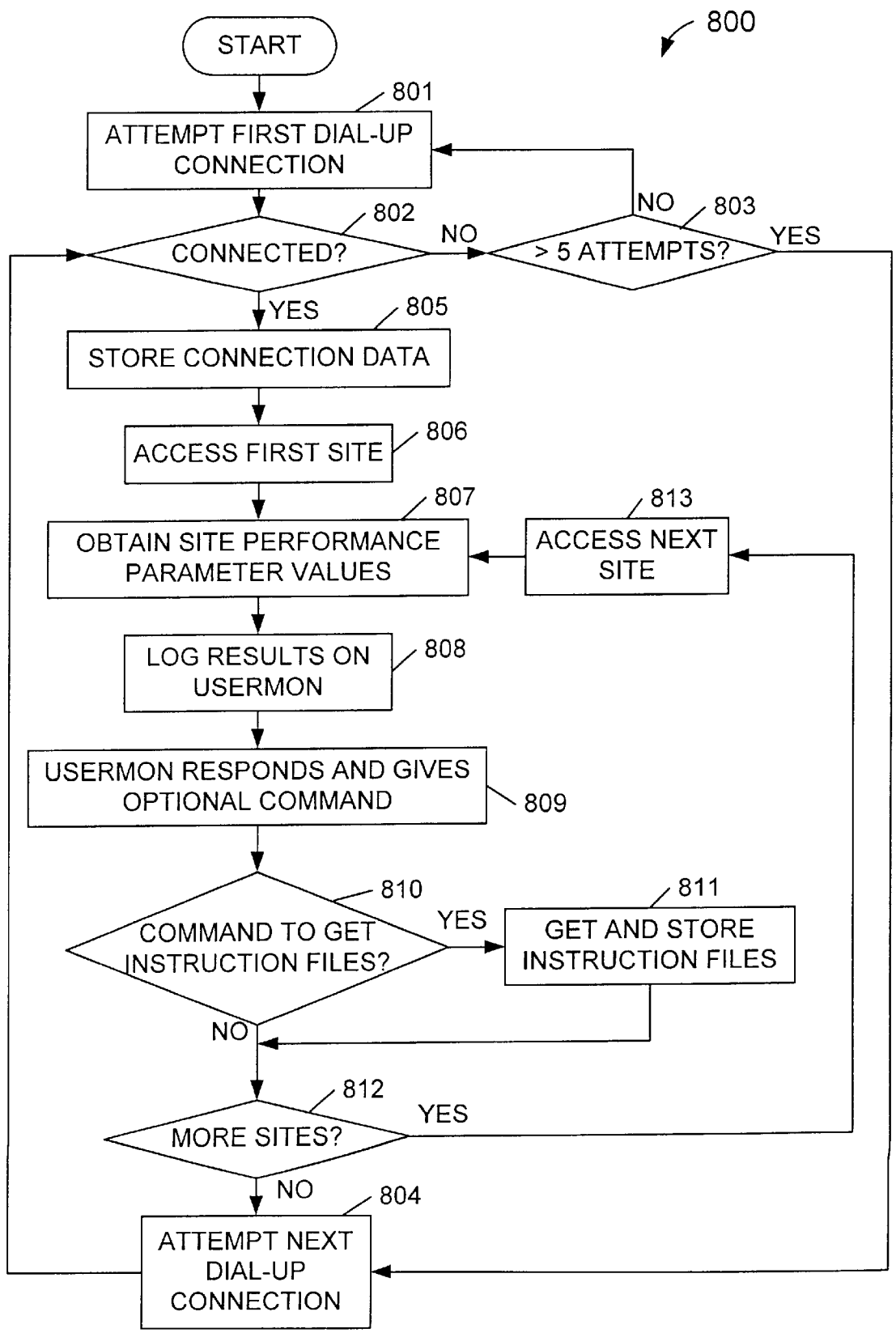
FIG. 8 is a flowchart of a method performed by a data-gathering client to access specified target sites in instruction files.

FIG. 8 is a flowchart of a method 800 performed by a data-gathering client to access specified target sites in instruction files 700. In step 801, the data-gathering client attempts to establish a local dial-up connection using an ISP dial-up telephone number in the instruction files. If the local dial-up connection is established, then processing proceeds to step 805. If the data-gathering client is unable to establish the local dial-up connection, then the data-gathering client attempts to establish the local dial-up connection again (steps 803 and 801) and logs the failed attempt. This log is delivered later to the UserMon server along with a time stamp.

If the data-gathering client cannot establish the local dial-up connection after a predetermined number of attempts (in the illustrated example, five attempts), then the data-gathering client records that it could not establish the connection and moves on to attempt the next local dial-up connection listed in the instruction files (step 804). If, on the other hand, the local dial-up connection is established, then the data-gathering client stores data (step 805) indicative of the performance of the dial-up connection. This data may include the number of times the data-gathering client had to dial the telephone number before a connection was made (i.e., the number of redirects), the total amount of time used to establish the dial-up connection, and the data transfer speed (baud rate) of the connection.

Processing proceeds to step 806 after the dial-up connection is established. The data-gathering client then attempts to access the first site in the list of target sites in the instruction files. The data-gathering client monitors (step 807) the Internet connection and obtains performance-parameter values indicative of a user's experience accessing the site. Such performance-parameter values may include full-page download time and full-page size. The data-gathering client then "logs" the performance-parameter values by pushing the values to the UserMon server over the Internet (step 808).

The UserMon server responds (step 809) to the data-gathering client by returning a message acknowledging receipt of the performance-parameter values. The message also includes a software version notification. If the software version indicates a new version of the data-gathering client software is available, the data-gathering client initializes a self-upgrade sequence that results in a full upgrade of the software. The message is discussed in detail in connection with FIGS. 10 and 11.

An optional command may be transmitted to the data-gathering computer along with the message. One command instructs the data-gathering client to retrieve new information in the instruction files. If there is such a command (step 810), then the data-gathering client issues an HTTP GET instruction to retrieve its instruction files from the UserMon server. Processing then proceeds to step 812.

If there are more sites listed in the instruction files, then processing proceeds to step 813. The data-gathering client thus accesses numerous sites using the same dial-up connection. For each site, the data-gathering client collects performance-parameter values and then pushes these values onto the UserMon server.

Processing proceeds to step 804 after performance-parameter values have been collected for each site in the instruction files (step 812). The data-gathering client then disconnects the dial-up connection and attempts to establish another dial-up connection using the next ISP telephone number in the RAS instruction file 701. In this way, the data-gathering client attempts to access all target sites listed in the instruction files using every ISP telephone number listed in the instruction files.

Figure 9:
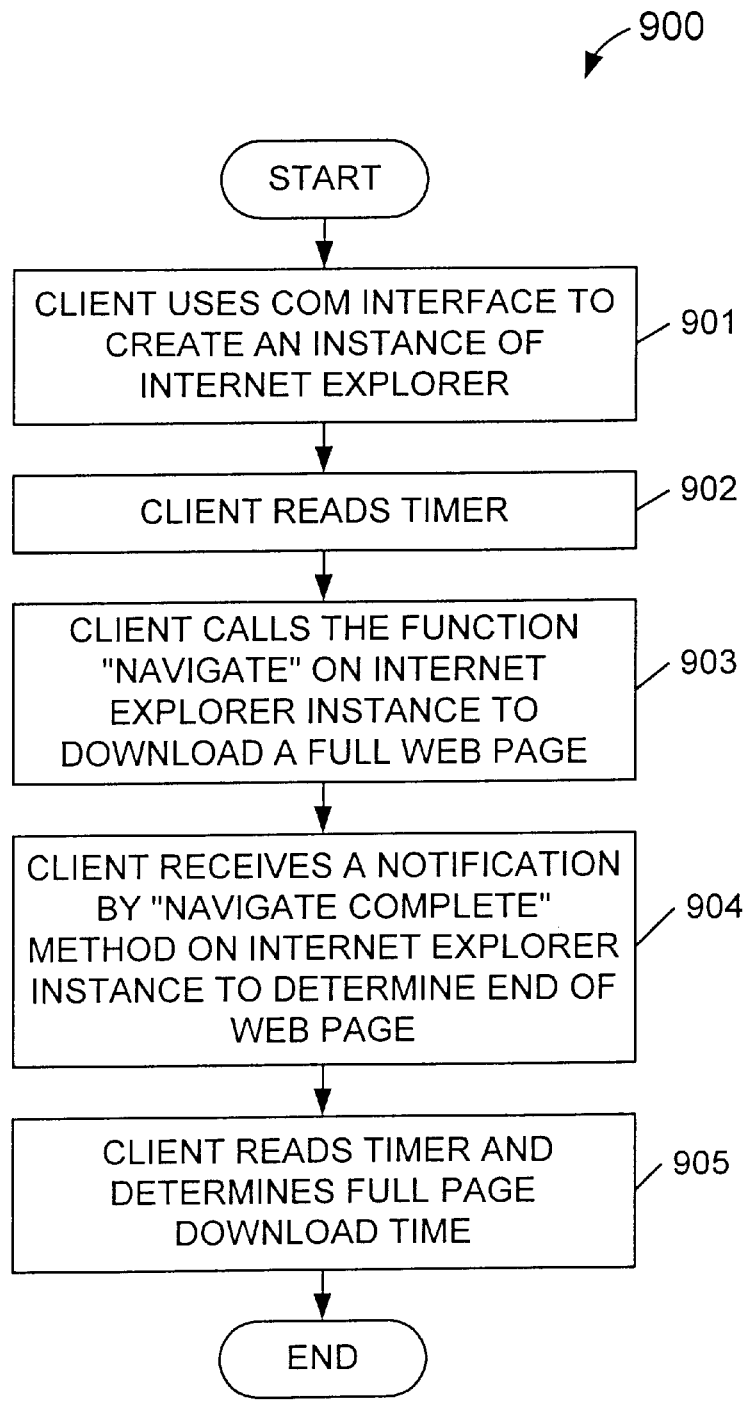
FIG. 9 is a simplified flowchart of one possible method performed by the data-gathering client for determining full-page download time.

FIG. 9 is a simplified flowchart of one possible method 900 performed by the data-gathering client to obtain a particular performance-parameter value, namely full-page download time. The "WINDOWS" 98 and "WINDOWS NT" operating systems maintain an object of the Internet Explorer Internet browser. In this example, the data-gathering client is a computer running one of these operating systems. In step 901, the data-gathering client causes an instance of the Internet Explorer object to be created and used in accordance with component object model (COM) programming techniques. For more information on COM programming techniques, see "Inside COM Microsoft's Component Object Model" by Dale Rogerson, available from "MICROSOFT PRESS", the entire book, pages 1–361

(1997). A COM interface called "IWebBrowser2" is a group of functions that can be called on an Internet-Explorer object to query the Internet. For additional information on the "IWebBrowser2" interface, see the full specification of the IWebBrowser2 interface. A copy of this full specification is available on Microsoft Corporation's main web site, www.microsoft.com, under the link "developer resources."

After creating an instance of Internet Explorer in step 901, the data-gathering client reads an internal timer using the "WIN32" application-programming interface (step 902). In one embodiment, the "QueryPerformanceCounter" function is called to return a timer reading in microseconds. Alternatively, the "GetTickCount" function is called to return a timer reading in milliseconds.

Next (step 903), the data-gathering client calls the "Navigate" function on the Internet Explorer instance. This function takes a URL of a web page, accesses the web page, and then downloads that page.

The data-gathering client receives a notification by the "NavigateComplete" method from the Internet Explorer instance (step 904). "NavigateComplete" returns a Boolean value that indicates that the Internet Explorer instance has received the end of the web page. Upon receipt of an end-of-page notification from "NavigateComplete," the data-gathering client reads the timer using the "WIN32" API. Either the "QueryPerformanceCounter" or the "GetTickCount" function can be used. The data-gathering client then determines the "full-page download time" by subtracting the timer reading in step 901 from the timer reading in step 905.

The "HTTPGetTime" performance-parameter value (also called "page script download time") indicates the amount of time to obtain the first script on the target web page. The "HTTPGetSize" performance-parameter value (also called "page script size") is the size of this first script. Values for the "HTTPGetTime" and "HTTPGetSize" performance parameters are obtained in accordance with one embodiment using the "InternetReadFile" function of the WinInet API. First, a timer on the data-gathering client is read. Then, functions including the "InternetReadFile" function are called. "InternetReadFile" returns several variables. The function returns a TRUE to indicate the function succeeded in downloading the requested data. The function returns a size value indicating the remaining amount of data to be downloaded. When the function returns both a TRUE and a size value of zero, then the function has successfully downloaded the first script of the target web page. The data-gathering client then reads the timer. The difference between the two timer readings is the "HTTPGetTime" performance-parameter value. The "InternetReadFile" function also returns a pointer to a number of bytes downloaded. This number of bytes is the "HTTPGetSize" performance-parameter value.

Figure 10:
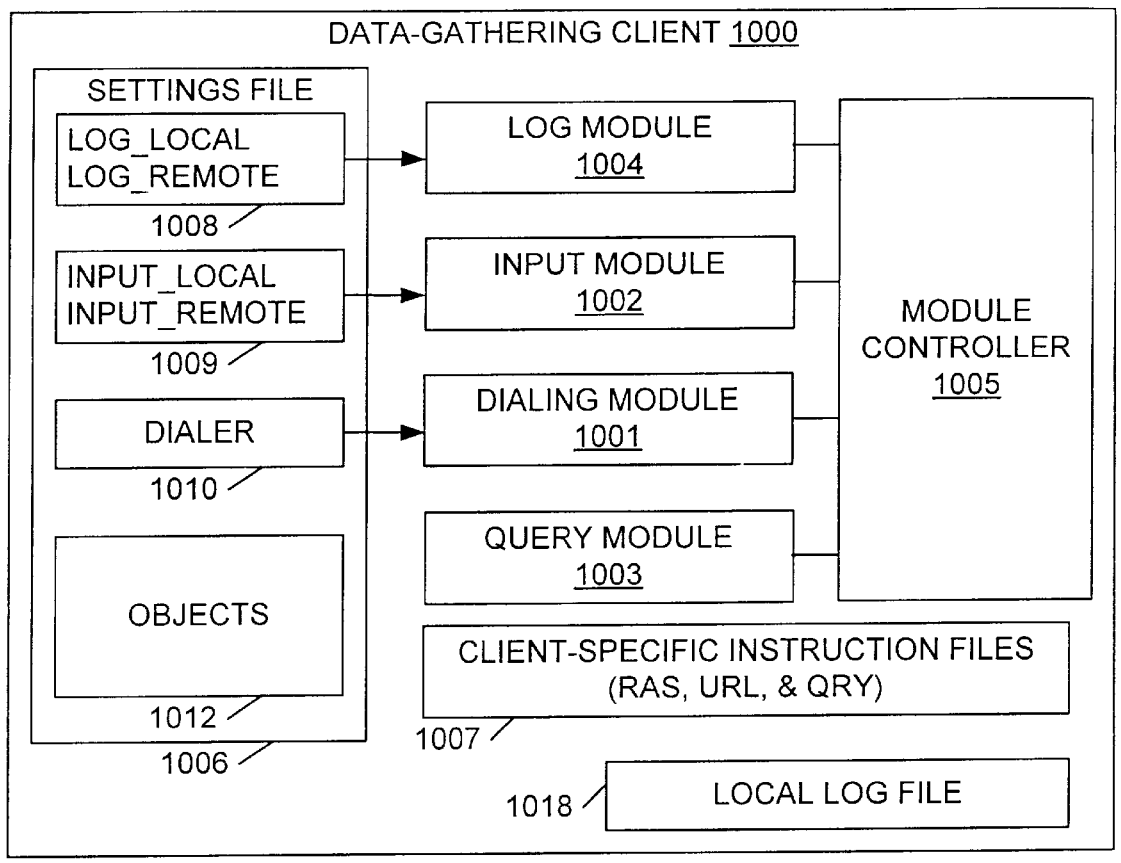
FIG. 10 is a diagram illustrating a specific embodiment of a data-gathering client 1000.
Figure 11:
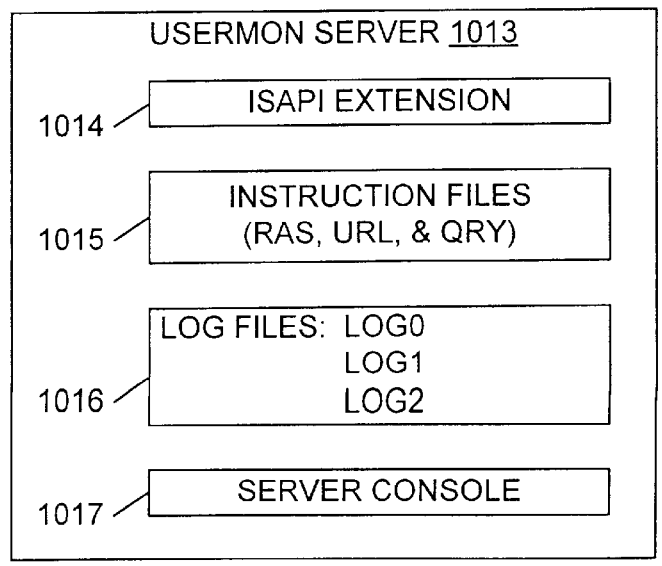
FIG. 11 is a diagram illustrating a specific embodiment of a UserMon server 1013.

FIG. 10 is a diagram illustrating a specific embodiment of a data-gathering client 1000. Data-gathering client 1000 includes a dialing module 1001, an input module 1002, a query module 1003, a log module 1004, a module controller 1005, a settings file 1006, client-specific instruction files 1007, and a local log file 1018. Settings file 1006 includes a LOG_LOCAL and LOG_REMOTE section 1008, an INPUT_LOCAL and INPUT_REMOTE section 1009, a DIALER section 1010, and an OBJECTS section 1012. FIG. 11 is a diagram illustrating a specific embodiment of a UserMon server 1013. UserMon server 1013 includes an ISAPI extension 1014, instruction files 1015, log files 1016, and a server console 1017.

Dialing module 1001 uses information in the dialer section 1010 of the settings file 1006 to configure itself and then uses information in the local RAS instruction file of the instruction files 1007 to connect to a specific ISP server. Input module 1002 uses information in the INPUT_LOCAL and INPUT_REMOTE section 1009 of the settings file 1006 to configure itself and then receives from the UserMon server 1013 the client-specific instruction files 1007, which are then stored on the data-gathering client 1000.

Log module 1004 uses information in the LOG_LOCAL and LOG_REMOTE section 1008 of the settings file 1006 to configure itself and then pushes performance-parameter values to the UserMon server 1013. The UserMon server 1013 stores these performance-parameter values in log files 1016. Log module 1004 logs the performance-parameter values to local log file 1018 or to the UserMon server, depending on a setting in the settings file. Regardless of the setting, if log module 1004 cannot communicate with UserMon server 1013, then log module 1004 stores the performance-parameter values in local log file 1018 and the performance-parameter values in the local log file are relayed to the UserMon server 1013 when communication is established or reestablished. Log module 1004 also receives and interprets commands received from the UserMon server and then notifies other modules that actually execute the commands.

Query module 1003 accesses web pages specified by URLs in the URL instruction file of the instruction files 1007. Query module 1003 also checks web pages specified by URLs to see if those web pages contain particular "must" and "fail" strings specified in the URL instruction file of the instruction files 1007. Query module 1003 uses an instance of an application program (for example, the Microsoft Corporation's Internet Explorer web browser) to access these web pages. After query module 1003 has executed a query, log module 1004 sends the query results to UserMon server 1013. Query module 1003 also executes a "software upgrade" command. At initialization of the data-gathering client 1000, query module 1003 determines if the UserMon system software on the data-gathering client is the latest version. If it is not, then query module 1003 retrieves the latest version from UserMon server 1013 and upgrades the software on the data-gathering client automatically without user intervention. Controller 1005 is a high level main program that loads modules, unloads modules, and uses the other modules 1001–1004 as necessary to carry out UserMon functionality.

ISAPI extension 1014 of the UserMon server 1013 communicates the with data-gathering client 1000 using the HTTP communication protocol, receives performance-parameter values from the data-gathering client 1000, logs performance-parameter values in log files 1016, and sends commands to the data-gathering client 1000. ISAPI extension 1014 is written in accordance with the ISAPI standard. For additional information on the ISAPI standard, see the "ISAPI Server Extensions and Filters" and "Developing ISAPI Extensions" documents, copies of which are available on Microsoft Corporation's website, http://premium.microsoft.com.

Server console 1017 includes a user interface that allows a human user to examine log files 1016, change the settings files of data-gathering clients of the system, and control the system in general. Server console 1017 includes an editor that performs basic checks of actions taken by the user in order to prevent the user from making certain syntax and configuration errors.

Instruction files 1015 contains a plurality of sets of client-specific instruction files. Each set of client-specific instruction files includes RAS, URL and QRY information for a given data-gathering client. Each set of of these instruction files is transferred to a corresponding data-gathering client to become its client-specific instruction files 1007. FIG. 7 and the associated text describes an embodiment of these client-specific instruction files. Log files 1016 are repository files for system status information including performance-parameter values sent by the data-gathering clients to the UserMon server 1013.

Section 1008 of settings file 1006 has two parts. The first part, "LOG_LOCAL," has a destination key that specifies a local file to which performance-parameter values are written if the data-gathering client cannot communicate with the UserMon server. The second part, "LOG_REMOTE" has a destination key that specifies a method for sending log lines to UserMon server 1013. "LOG_REMOTE" also has a proxy key that specifies which proxy to use in case proxy use is required for the remote logging operations (may be different than the proxy used for the Input module).

Data-gathering client 1000 can be configured to receive one or more of its RAS, URL and/or QRY inputs locally from the data-gathering client itself rather than from UserMon server 1013. This feature is usable to prevent the UserMon server from overwriting the client-specific instruction files 1007. The data-gathering client can be configured to operate in a stand alone local mode so that it does not communicate with a UserMon server, but rather receives commands from the INPUT_LOCAL section of the settings file and logs performance-parameter values in a file on the data-gathering client. The INPUT_LOCAL section may, for example, be located on the hard drive of the data-gathering client.

Section 1009 of setting file 1006 has two parts. The first part, "INPUT_LOCAL," contains settings required by Input module 1002 when the data-gathering client is receiving its inputs locally. There are three keys in the "INPUT_LOCAL" part: a RAS key, a URL key and a QRY key. Each of these keys identifies a file on the data-gathering client that contains input information when the data-gathering client is operating in the local mode.

The second part, "INPUT_REMOTE," contains settings required by the input module when the data-gathering client is receiving its input from the UserMon server. There are five keys in the "INPUT_REMOTE" part: a RAS key, a URL key, a QRY key, a "RemoteSetup" key, and a "Proxy" key. The RAS, URL and QRY keys specify locations where the RAS, URL and QRY information is located on the UserMon server, respectively. The "RemoteSetup" key specifies a location where a setup program resides on the UserMon server. The "Upgrade" command causes the data-gathering client to get the setup program on the UserMon server identified by the "RemoteSetup" key using the HTTP GET command and to execute that program. The setup program executing on the data-gathering client does the actual upgrading of the software on the data-gathering client. The "Proxy" key specifies a location of a proxy to use in case proxy use is required for input received from the UserMon server. This proxy may be different than the proxy used when input is received by the log module. Key values that specify remote locations are prefixed with "http://".

Dialer section 1010 of settings file 1006 contains multiple fields of settings used by the dialing module 1001. The first field, the "location" field, contains the data-gathering client ID. The UserMon server maintains information indicating the geographical location of the data-gathering clients by ID. When the UserMon server receives communication from a data-gathering client having a particular ID, the UserMon server is able to match the ID to a geographical location where the data-gathering client that transmitted the ID is supposed to be located.

The second field, the "reboot time" field, indicates when the data-gathering client is to reboot itself. The reboot field has five space-separated subfields: a minute subfield (0–59), an hour subfield (0–23), a day of the month subfield (1–31), a month subfield (1–12), and a day of the week subfield (0–6, 0=Sunday). Each subfield can include a comma-separated list of values, or include a "*" to indicate all values. The data-gathering client reboots itself when the local time maintained by the data-gathering client matches all the field values. For example, "5 0 * * *" causes the data-gathering client to reboot daily at 12:05 AM, "27 2,14 * * 3" causes the data-gathering client to reboot at 2:27 AM and at 2:27 PM every Wednesday, "0 15 25 12 *" causes the data-gathering client to reboot at 3 PM on Christmas, and "0 0 1,15 * 1,2,3,4,5" causes the data-gathering client to reboot on the first and fifteenth day of every month, but only if they fall on a weekday.

The third field, the "OperationLogMode" field, specifies how performance-parameter values will be logged. A "0" value specifies no logging, a "1" value specifies logging to the UserMon server console, a "2" specifies logging to a file, and "3" specifies logging to both the UserMon server console and to a file.

Object section 1012 of settings file 1006 contains a set of dynamic-link library (DLL) components. When an instance of particular module is needed by the main data-gathering client program at runtime, the DLL component of that object is dynamically linked in. A DLL is a compiled version of the object that can be linked into the main program at run time. There is a DLL component for the log module, a DLL component for the input module, a DLL component for the dialing module, and a DLL component for the query module. There is an "input" key that specifies which DLL to use for the input module, a "log" key that specifies which DLL to use for the log module, a "dialing" key that specifies which DLL to use for the dialing module, and a "query" key that specifies which DLL to use for the query module.

Log files 1016 includes four types of log files: a LOG0 file denoted "WPMLog0-YYMMDD.txt", a LOG1 file denoted "WPMLog1-YYMMDD.txt", a LOG2 file denoted "WPMLog2-YYMMDD.txt", and a LOG3 file. Each log file has its own specific format and data fields. Each line of each log file is made up of fields separated with semi-colons. To reduce the size of individual log files, the UserMon server is configured to save log files periodically (for example, at the end of every day) so that newly received performance-parameter values will be written to new log files. The "YYMMDD" in the log file name is a date stamp indicating the date the log file was saved.

The LOG0 file contains the performance-parameter values obtained by the data-gathering client when querying the Internet pages. The LOG0 file has the following fields:

ServerGMTTime: Greenwich Mean Time (GMT) when the performance-parameter values were logged in the log file on the UserMon server;

DialerName: An ID for the data-gathering client that issued the log request for the performance-parameter values logged. The term "dialer" as used here means a "data-gathering client" that makes dial-up connections to the Internet;

DialerDate: The date the performance-parameter value was obtained by the data-gathering client;

DialerTime: The time the performance-parameter value was obtained by the data-gathering client;

POP: The physical location of the ISP's point of presence;

ISPName: The name of an ISP used by the data-gathering client to obtain a network connection (identified by the "DialerName" field);

ISPPhone: The actual telephone number dialed by the data-gathering cleint;

TargetName: The name of the target (web site); for example, Yahoo, Netscape Home, Excite Search;

ErrorCode: A Boolean value indicating whether the performance-parameter values of the log request were successfully logged by the UserMon server. The UserMon server may, for example, have been unable to log the performance-parameter values due to a shortage of storage space. These values are indicative error conditions. These error conditions include 'DNS Timeout' and 'page not found';

HTTPGetTime: The time required to get the first script code on the target web page;

HTTPGetSize: The size of the first script code on the target web page;

FullPageTime: The time measured by the data-gathering client to download the specified web page, code and attached elements. Attached elements may include graphics data and sound data;

FullPageUncompressedSize: The uncompressed size (true size) of the specified web page; true size;

FullPageCompressedSize: The actual size of the data transferred between modems after both software and hardware compression has been applied. A modem may receive compressed data and convert it into uncompressed data. "WINDOWS NT" reports information from such a modem including a number of bytes of data transferred to the modem before being uncompressed (compressed number of bytes) and a number of bytes of data transferred after the modem uncompressed the data (uncompressed number of bytes). A data-gathering client uses this feature of "WINDOWS NT" to determine the FullPageUncompressedSize and FullPageCompressedSize;

NumberOfRedirects: It is common on the Internet to provide empty web pages that only contain redirection information, basically forwarding the browser to another URL. This field contains a count of how many times the browser has been forwarded (redirected) before reaching the destination page;

TimeForRedirects: This field contains a measure of the time it took to forward the browser between the first destination reached and the ultimate web page it finally reached;

DNSResolutionTime: Each machine connected to the Internet has a domain name server assigned to it. DNSResolutionTime is the time required to get the IP address for the target name from the domain name server;

ConnectSpeed: The modem connection speed recorded when recording the performance-parameter values of the specified web page;

TargetID: The target ID of the specified web page, including conditional strings;

ConnectISPTime: Time to establish connection to ISP; and

ConnectTargetTime: Time to establish connection to target site.

The LOG1 file is a data-gathering client notification log file. Notifications, confirmations, client errors, modem errors, telephone line errors and other similar communications from data-gathering clients are logged in the LOG1 file. The LOG1 file may contain the following fields: ServerGMTTime, DialerName, DialerDate, DialerTime, DialerGMTTime, and LoggedMessage. The LoggedMessage field contains the text of the message. One possible message is the command ID and command name of a command that was confirmed as received by the data-gathering client. ServerGMTTime is the time that the message was logged in the LOG1 log file. DialerTime is the GMT time when the message was sent by the data-gathering client. DialerName contains an ID of the data-gathering client that confirmed receipt of the message. DialerDate indicates the date of the message. DailerGMTTime is the GMT time of an event as determined by the data-gathering client. To determine DialerGMTTime, the data-gathering client compares GMT time transmitted by the UserMon server to local time maintained on the data-gathering client to obtain a time offset between the data-gathering client's local time and GMT time. The data-gathering client determines the GMT time of an event by determining the local time of the event and then calculating the GMT time of the event using local time of the event and the offset.

The LOG2 file is the UserMon server notification log file. Acknowledgements, notifications, abnormalities and warnings from the UserMon server are logged here. The LOG2 file has the following fields: ServerGMTTime and LoggedMessage. LoggedMessage is the message (for example, command ID of a command) received by the UserMon server from the CMD.txt input file. ServerGMTTime is the time that the UserMon server logged the message in the LOG2 file.

The LOG3 file is not an actual file but rather is a virtual file ("null" file). In case a data-gathering client does not actually have performance-parameter values to log but nonetheless wants to receive commands from the UserMon server, the data-gathering client can log a fictitious request in the LOG3 "null" file. A data-gathering client can use the LOG3 log during its idle time to check the UserMon server for pending commands assigned to the data-gathering client.

The UserMon system may include data-gathering clients spread over the globe across many time zones. Rather than keeping track of events reported in the local time zones of the many data-gathering clients reporting results, events are tracked using a single universal time, Greenwich Mean Time (GMT). Data-gathering clients send GMT times to the UserMon server. GMT time can be easily converted back to local time by adding or subtracting a known hour value from the GMT time.

Data-gathering client 1000 communicates with UserMon server 1013 by sending a "log request" to UserMon server 1013 and pushing performance-parameter values to the UserMon server. The log request includes: a request command, data-gathering client 1000's unique ID name, GMT (date and time), and performance-parameter values, all separated with semicolons. The request command consists of a "log ID" field, and an optional notification field.

A "0" in the "log ID" field specifies logging the request in a data log (regular log). A "1" in the "log ID" field specifies logging the request in the client notification log. A "2" in the "log ID" field specifies logging the request in the server notification log. A "3" in the "log ID" field specifies logging the request in a "null" log. When the "null" log is specified, a request is not logged on the server. Rather, a "null" log can be sent to notify the UserMon server of an event.

A "C" in the notification field indicates that the data-gathering client does not want to receive any commands immediately following the request. The "C" notification is used when the data-gathering client is in the middle of a series of transfers and does not want to receive commands from the UserMon server. For example, the "C" notification is used when the data-gathering client's local log file is flushed to the server after a server or network outage. A "D#" in the notification field indicates that the data-gathering client is running out of disk space. The "#" is an integer that specifies how many bytes of disk space are still available. A "M#" in the notification field indicates that the data-gathering client is running out of memory. The "#" is an integer specifying how many bytes of memory are left still available.

After receiving the "log request" from the data-gathering client 1000, the UserMon server 1013 issues a response to the data-gathering client 1000. This response includes: a "StatusCode" field, a "GMTTime" field, a client software version field, and an optional command field. All fields of the response are separated with spaces.

The "StatusCode" field is a Boolean value. "TRUE" indicates that no data was lost, that the request was successfully processed, and that the request need not be retransmitted. "FALSE" indicates that the request should be locally logged and retransmitted later.

The "GMTTime" field is a field for transmitting the current Greenwich Mean Time. A data-gathering client uses this value to determine a time offset of its local time to Greenwich Mean Time. This value is used be the data-gathering clients to synchronize Internet querying and to standardize time stamps relative to a universal time.

The "Version" field contains a hexadecimal representation of the software version of data-gathering client software that is maintained on the UserMon server. When the data-gathering client has a lower version number than is indicated by the received "version" field, the data-gathering client initiates an auto-upgrade sequence and loads new software from the UserMon server. The version field is optional.

The "Command" field specifies a command for the data-gathering client to execute. Commands include the following five commands.

The first command, the "reboot" command, specifies the time and date at which the data-gathering client will reboot itself. To avoid having to travel to the locations of crashed data-gathering clients, the reboot command is provided so the data-gathering clients can be rebooted remotely. For example, operation of the data-gathering client may become degraded after operating for an amount of time due to the data-gathering client using an ever increasing amount of memory. To avoid this degradation and a potential eventual crash, the data-gathering client is controlled to reboot itself periodically. The command line includes the following subfields: a minute subfield (0–59), an hour subfield (0–23), a day of the month subfield (1–31), a month subfield (1–12), and a day of the week subfield (0–6, 0=Sunday). Each subfield can include a comma-separated list of values, or include a "*" to indicate all values. The data-gathering client reboots itself when the local time maintained by the data-gathering client matches all subfield values.

The second command, the "idle" command, specifies a period of time that the data-gathering client is not to be obtaining performance-parameter values. The data-gathering client can be instructed to stay connected to the Internet so that other software resident on the data-gathering client can use the connection to communicate with the UserMon server. For example, the UserMon server can use a program called "NETMEETING" to examine the desktop and change desktop settings of an idling data-gathering client. The "NETMEETING" software is available from Microsoft Corporation as part of the Internet Explorer 4.0 web browser. The "idle" command has the following parameters (on date-timeGMT for Xminutes [connected(default) |disconnected] [NetMeeting IPaddress, other parameters]).

The third command, the "getfile" command, causes the data-gathering client to get a file specified by a URL in the getfile command line. The file is then stored on the data-gathering client at a location specified using a path name in the getfile command line. The command-line format for the getfile command is "UrlOfTheFile LocalPathAndFileName." After file transfer, log module 1004 returns a value indicating that the getfile command was executed successfully. The UserMon server can use the getfile command to have a data-gathering client read a selected file (for example, a new settings file) from the UserMon server.

The fourth command, the "UpdateDialers" command, is a server-only command that is issued when a data-gathering client is added to the system or is removed from the system. The command line should be: "SERVER: UpdateDialers."

The fifth command, the "ExpireCommand" command, is a server-only command. The "ExpireCommand" command issues when an operator wants to remove a pending data-gathering-client command that has been accepted by the UserMon server but has not yet been sent to the data-gathering client. The command line should be: "SERVER: ExpireCommand [CmdID]."

An operator of the UserMon server 1013 can cause such commands to be sent to one or more data-gathering clients in the system. To do this, the operator writes a command (or series of commands) to a file "Input\CMD.txt" on the UserMon server 1013. Each line of this file is a command, in the format set forth above, except that each line is preceded by either a specific data-gathering client name or, if the command is specific to UserMon server 1013, with the word SERVER. For example, the line: "NewYork1: getfile http://131.107.17.164/input/HelloWorlds.txt C:\Windows\Hello.txt" causes the getfile command to be sent to the data-gathering client named "NewYork1." NewYork1 would get the file "HelloWorlds.txt" and save the file as "C:\Windows\Hello.txt" on the data-gathering client.

UserMon server 1013 reads all the commands in the "Input\CMD.txt" file, assigns a unique command ID to each command, adds those commands and command IDs to a list of pending commands stored in memory on the UserMon server, logs acknowledgement of receiving each command in LOG2, and then deletes the "Input\CMD.txt" file. (Only the UserMon server assigns command IDs and every command on the system is assigned its own unique command ID.) When the UserMon server responds to a data-gathering client, the UserMon server includes any command in its internal list of pending commands for that data-gathering client.

When a data-gathering client receives the UserMon response, it extracts the command and returns a confirmation of having received the command. The command ID is included with the confirmation to indicate the particular command being confirmed. UserMon server 1013 receives this confirmation, logs the confirmation in LOG1, and then removes the command and command ID for this data-gathering client from its internal list of pending commands.

Figure 12:
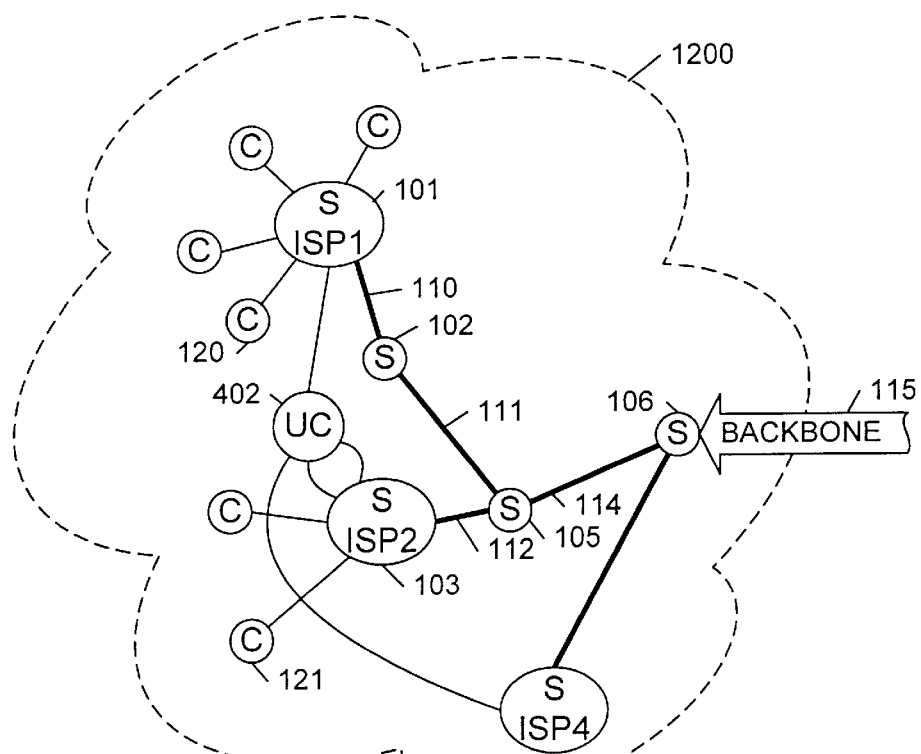
FIG. 12 depicts a portion of a system of data-gathering clients in accordance with the invention.

FIG. 12 depicts a portion of a distributed system of data-gathering clients configured in accordance with the invention. The elements of FIG. 12 are similar to those of FIG. 4, like numbered elements being the same. Data-gathering client 402 establishes connections to ISP1, ISP2, and an ISP4, each of which is located within a selected geographical area 1200. Area 1200 is typically a local market within which data-gathering client 403 can establish connections to various ISPs via local dial-up connections. Client 402 establishes one or more local connections, dial-up or otherwise, to ISPs in area 1200. From this perspective, data-gathering client 402 can assess the performance of local ISPs. Many ISPs can be accessed using a number of local numbers, and/or using a number of different types of connections. For example, a given ISP can offer different local dial-up numbers that support different modem speeds, or can support different communication protocols, such as standard modem (POTS, or plain-old telephone service), ISDN (integrate-services digital network), or DS1. Data-gathering client 402 is therefore equipped to connect to some ISPs via several different paths.

Figure 13:
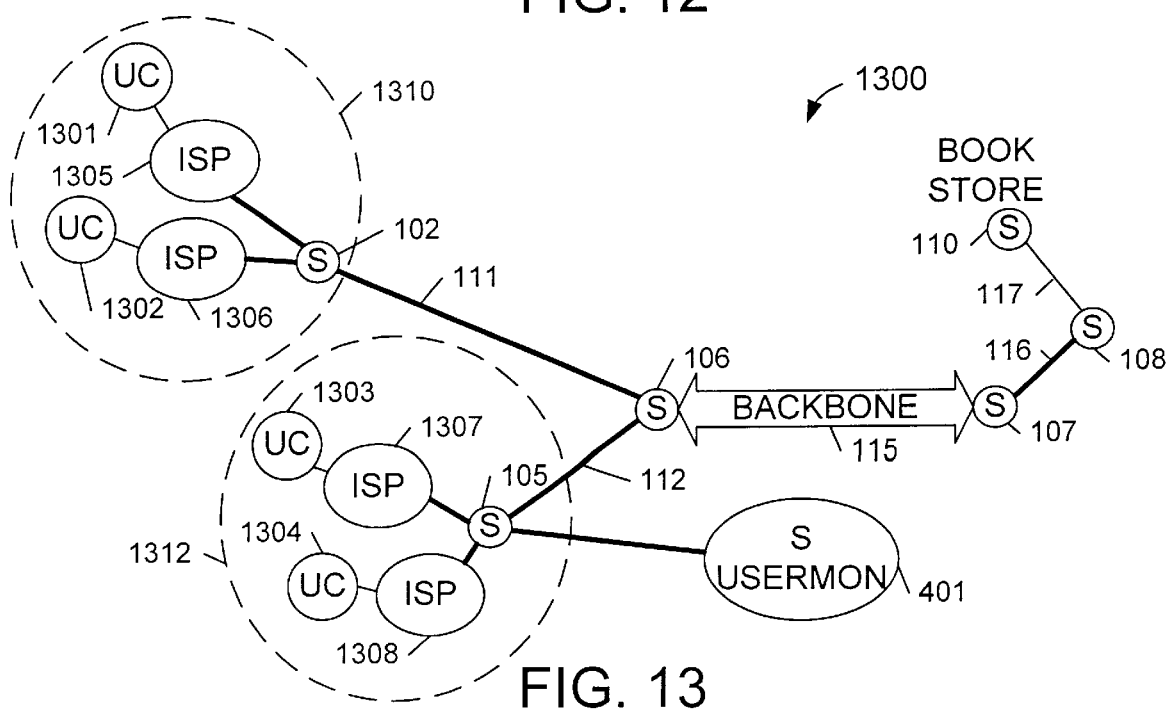
FIG. 13 illustrates a system in accordance with a method for identifying which portion of an Interconnect connection is degraded.

In accordance with some embodiments, the UserMon system obtains information indicative of which part of the Internet connection is causing Internet connection degradation. FIG. 13 illustrates a system 1300 wherein four data-gathering clients 1301–1304 are connected to four respective ISP servers 1305–1308. ISP servers 1305 and 1306 are disposed in the same local geographical area 1310. In the example being described, they are within 500 miles of one another. ISP servers 1307 and 1308 are disposed in a second local geographical area 1312. In the example, they are within 500 miles of one another. None of the ISP servers in one geographical area is within the 500-mile limit of any ISP server within the other geographical area and visa versa. The remaining elements of FIG. 13 are described above in connection with FIGS. 1–4, like-numbered elements being similar.

In accordance with the above-described user-experience monitoring system, each of the data-gathering clients 1301–1304 accesses the target bookstore server via its respective ISP server. Each data-gathering client then obtains performance-parameter values indicative of the performance of its respective Internet connection to the target bookstore and pushes push these performance-parameter values to the UserMon server. This data can then be used to diagnose Internet-connection problems, such as data bottle-necks that limit connection bandwidth.

Consider, for example, a situation in which data-gathering clients 1301 and 1302 report similar unacceptably slow Interconnect connections to UserMon server 401, whereas data-gathering clients 1303 and 1304 report acceptable Interconnect connections. Based on these data, UserMon server 401 can conclude that the bottleneck is not associated with any Internet infrastructure used to connect ISPs 1307 and 1308 to bookstore server 110. UserMon server 401 can further conclude that the problem is not likely one of ISPs 1305 and 1306, as they both suffer similar bandwidth limitations. The problem is likely to be a bandwidth limitation of those elements common to ISPs 1305 and 1306 that do not affect ISPs 1307 and 1308. As shown in FIG. 13, the likely Internet resources that are imposing the bandwidth limitation are either server 102 and/or high-speed connection 111. This type of information can be an invaluable trouble-shooting aid for pinpointing bandwidth limitations.

The following examples further illustrate how data gathered by data-gathering clients may be used, in accordance with the invention, to troubleshoot Internet connections. If problems and/or performance degradation appearing through a first ISP do not appear through another ISP in the same geographical area, then the problem lies most likely with the first ISP proper. If the same problems show on two ISP servers in the same geographical area and both ISPs are using the same backbone provider (for example, AT&T or Sprint), then the problem most likely lies with the common backbone. If a problem affects all local ISPs and is not particular to dial-up issues (line busy, no answer), then the problem most likely lies with the regional network infrastructure (for example, MayWest or MayEast). If the problem occurs through all ISPs and are related to dial-up issues such as busy line, no answer and/or no dial tone, then the problem likely lies with the regional telephone company (for example, USWest or GTE).

In accordance with some embodiments, rather than having the data-gathering clients just access a single target web page and obtain performance-parameter values pertaining to this access, the data-gathering clients carry out complete "transactions" over the Internet and obtain performance-parameter values indicative of a performance characteristic of these transactions. An example of such a transaction is the purchase of an airline ticket over the Internet. In such an instance, a data-gathering client accesses a target web page and then interacts with that web page and associated web pages, supplying any requested information until the transaction is complete. The data-gathering client logs performance-parameter values pertinent to the transaction. Such performance-parameter values may, for example, include whether the data-gathering client was successful in completing the transaction and how long it took to complete the transaction.

In one embodiment, a person uses a browser to interact with the target web site to complete a desired transaction and a proxy server is used to record the data that is transferred back and forth between the client and the target web site. The browser may open multiple connections to retrieve information from the web site. The proxy then records the headers of all such connections used, the time at which each connection is opened, and the time at which each connection is closed. The resulting data is then converted into a script which when executed will simulate the actions of the person and replicate the entire interaction with the target web site. A copy of this script is loaded onto each data-gathering client. The data-gathering client executes the script when the data-gathering client is to obtain performance-parameter values pertaining to the transaction. The transaction is then carried out as if the person were again interacting with the web site and the data-gathering client logs whether the transaction could be completed and, if so, how long it took to complete the transaction.

In accordance with one embodiment, a web page is maintained that is accessed via the Internet by an individual user who uses his/her own computer to access the web page. The web page informs the individual user of an action he/she can take to have his/her computer become a data-gathering client of the UserMon system. The web page may, for example, be a web page of an ISP that offers the individual user free ISP services or other incentives in return for allowing his/her computer to be a data-gathering client. If the individual user agrees to allow his/her computer to become a data-gathering client, then UserMon system software is transferred to and is installed on the computer of the individual user. The individual user may, for example, click on a button on the web page to make this agreement and to initiate the transfer and installation of this software. The UserMon system software can be configured to operate in the background, only at predetermined times, at times when the individual user is not using the computer, and/or at times when the individual user is not using the modem of the computer. The UserMon system software on the computer of the individual's computer causes the computer to become a data-gathering client of a UserMon system. Accordingly, data-gathering clients can be owned and/or controlled by a first entity whereas the UserMon server can be owned and/or controlled by a second entity.

Figure 14:
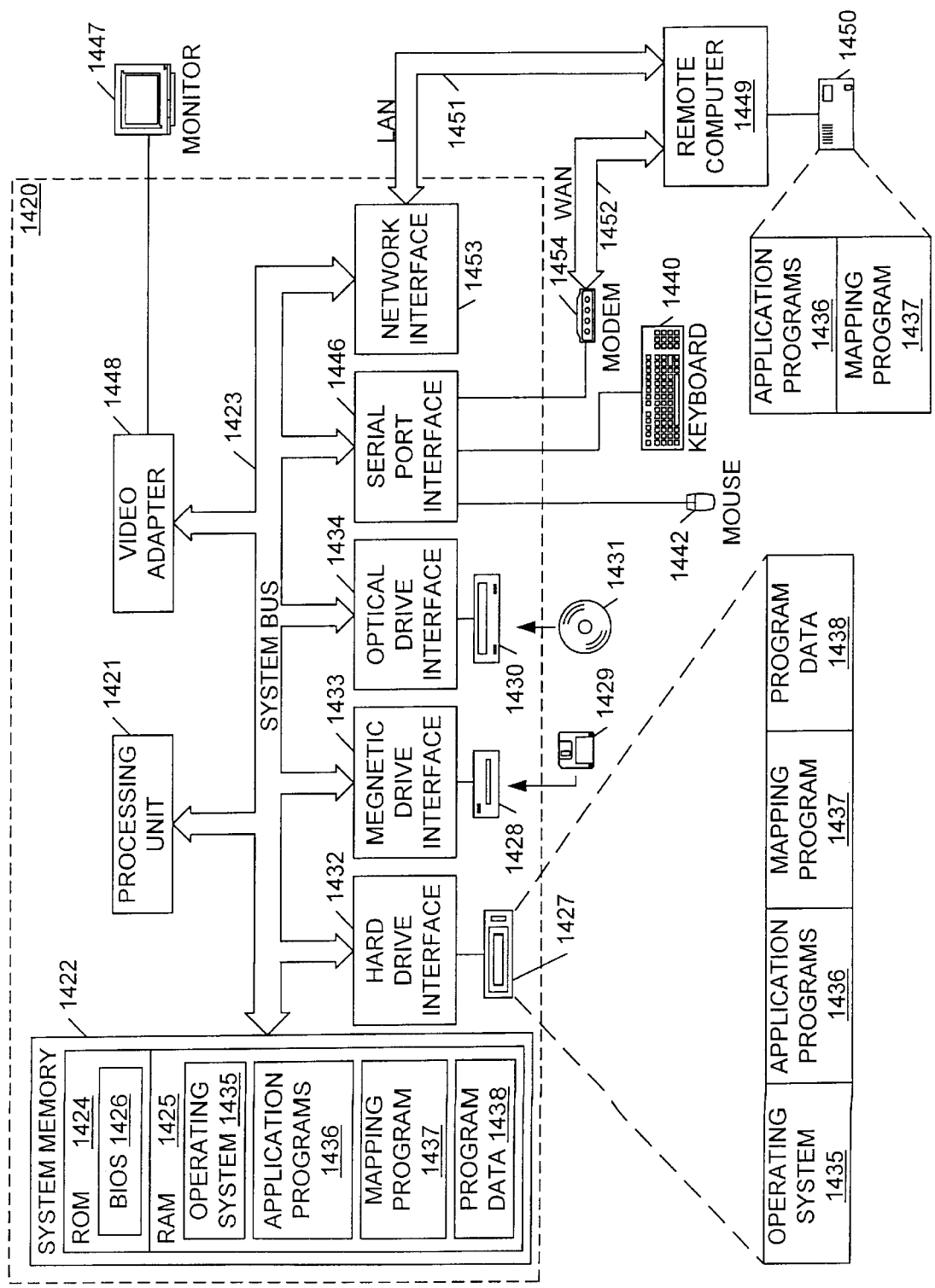
FIG. 14 is a diagram of a computing environment in which the invention may be implemented.

EXEMPLARY OPERATING ENVIRONMENT: FIG. 14 and the following discussion are intended to provide a brief, general description of a suitable computing environment in which the invention may be implemented. Although not required, the invention is described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 14, an exemplary computing system for implementing the invention includes a general purpose computing device in the form of a conventional personal computer 1420, including a processing unit 1421, a system memory 1422, and a system bus 1423 that couples various system components including the system memory to the processing unit 1421. The system bus 1423 may be any of several types of bus structures, including a memory bus or memory controller, a peripheral bus, and a local bus using any of a variety of bus architectures. The system memory includes read only memory (ROM) 1424 and random access memory (RAM) 1425. A basic input/output system 1426 (BIOS), containing the basic routines that help to transfer information between elements within the personal computer 1420, such as during start-up, is stored in ROM 1424. The personal computer 1420 further includes a hard disk drive 1427 for reading from and writing to a hard disk, not shown, a magnetic disk drive 1428 for reading from or writing to a removable magnetic disk 1429, and an optical disk drive 1430 for reading from or writing to optical disk 1431 such as a CD ROM or other optical media. The hard disk drive 1427, magnetic disk drive 1428, and optical disk drive 1430 are connected to the system bus 1423 by a hard disk drive interface 1432, a magnetic disk drive interface 1433, and an optical drive interface 1434, respectively. The drives and their associated computer-readable media provide nonvolatile storage of computer readable instructions, data structures, program modules and other data for the personal computer 1420. Although the exemplary environment described herein employs a hard disk, a removable magnetic disk 1429 and a removable optical disk 1431, it should be appreciated by those skilled in the art that other types of computer readable media which can store data that is accessible by a computer, such as magnetic cassettes, flash memory cards, digital video disks, Bernoulli cartridges, random access memories, read only memories, and the like, may also be used in the exemplary operating environment.

A number of program modules may be stored on the hard disk, magnetic disk 1429, optical disk 1431, ROM 1424 or RAM 1425, including an operating system 1435, one or more application programs 1436, other program modules 1437, and program data 1438. A user may enter commands and information into the personal computer 1420 through input devices such as a keyboard 1440 and pointing device 1442. Other input devices (not shown) may include a microphone, joystick, game pad, satellite dish, scanner, or the like. These and other input devices are often connected to the processing unit 1421 through a serial port interface 1446 that is coupled to the system bus, but may be connected by other interfaces, such as a parallel port, game port or a universal serial bus (USB). A monitor 1447 or other type of display device is also connected to the system bus 1423 via an interface, such as a video adapter 1448. In addition to the monitor, personal computers typically include other peripheral output devices (not shown), such as speakers and printers.

The personal computer 1420 may operate in a networked environment using logical connections to one or more remote computers, such as a remote computer 1449. The remote computer 1449 may be another personal computer, a server, a router, a network PC, a peer device or other common network node, and typically includes many or all of the elements described above relative to the personal computer 1420, although only a memory storage device 1450 has been illustrated in FIG. 14. The logical connections depicted in FIG. 14 include a local area network (LAN) 1451 and a wide area network (WAN) 1452. Such networking environments are commonplace in offices, enterprise-wide computer networks, intranets and the Internet.

When used in a LAN networking environment, the personal computer 1420 is connected to the local network 1451 through a network interface or adapter 1453. When used in a WAN networking environment, the personal computer 1420 typically includes a modem 1454 or other means for establishing communications over the wide area network 1452, such as the Internet. The modem 1454, which may be internal or external, is connected to the system bus 1423 via the serial port interface 1446. In a networked environment, program modules depicted relative to the personal computer 1420, or portions thereof, may be stored in the remote memory storage device. It will be appreciated that the network connections shown are exemplary and other means of establishing a communications link between the computers may be used.

Although the present invention is described in connection with certain specific embodiments for instructional purposes, the present invention is not limited thereto. The data-gathering clients need not connect to the Internet via dial-up connections. The data-gathering clients may, for example, connect to the Internet via cable TV connections, fiber optic connections, and wireless satellite connections. This invention may be used in cases where the connection to the Internet via any connection that provides dynamic IP addresses (as opposed to static IP addresses). A computer can be both a client and a server. Accordingly, various modifications, adaptations, and combinations of various features of the described embodiments can be practiced without departing from the scope of the invention as set forth in the claims.

What is claimed is:

1. A system, comprising:
   a. a first computer connected to the Internet;
   b. a second computer that receives from the first computer information identifying a target site to access, the second computer accessing the target site via a first local dial-up connection, the second computer obtaining a first performance-parameter value indicative of a performance characteristic of an Internet connection between the second computer and the target site, the second computer transmitting the first performance-parameter value to the first computer via the Internet; and c. a third computer that receives from the first computer the information identifying the target site, the third computer accessing the target site via a second local dial-up connection, the third computer obtaining a second performance-parameter value indicative of a performance characteristic of an Internet connection between the third computer and the target site, the third computer transmitting the second performance-parameter value to the first computer via the Internet, the third computer being disposed more than 500 miles away from the second computer, the first and second performance-parameter values being taken from the group consisting of: full-page download time, full-page size.

2. The system of claim 1, wherein the first computer stores a full-page download time for downloading to the second computer a web page from the target site, and wherein the first computer stores a full-page download time for downloading to the third computer the web page from the target site.

3. A method comprising:

a. at a first client, monitoring an Internet connection between the first client and a first server and obtaining a performance-parameter value for the Internet connection, the first client being connected to the Internet via a second server, the connection between the first client and the second server involving a first local dial-up connection;

b. at a second client, monitoring an Internet connection between the second client and the first server and obtaining a performance-parameter value for the Internet connection, the second client being connected to the Internet via a third server, the connection between the second client and the third server involving a second local dial-up connection; and c. sending the performance-parameter values obtained in (a) and (b) to a fourth server, the performance-parameter values being taken from the group consisting of: status code, full-page download time, uncompressed full-page size, compressed full-page size, page script download time, page script size, number of redirections, total redirection time, and DNS resolution time.

4. The method of claim 3, wherein the first and second clients access a web page on the first server using an application program, the application program being a program that is executable on another computer such that a graphical user interface of the application program on the other computer is usable to access Internet web pages.

5. The method of claim 4, wherein the application program is a web browser.

6. The method of claim 5, wherein the web browser is an instance of the Internet Explorer web browser.

7. The method of claim 3, wherein the performance-parameter value is full-page download time, and wherein step (a) further comprises:

i. accessing a web page on the first server, the web page having an end;

ii. using the web browser to determine when the end of the web page has been received at the first client; and iii. using a timer on the first client to determine a time elapsed between the accessing of (i) and the receiving of the end of the web page of (ii).

8. The method of claim 7, wherein a first time value is obtained by reading the timer before step (i), and wherein a second time value is obtained by reading the timer in step (iii), the elapsed time being a difference between the first time value and the second time value.

9. The method of claim 3, further comprising:

d. prior to step (a), the first client obtaining from the fourth server an address of the first server, the first client using the address of the first server to establish the Internet connection between the first client and the first server; and e. prior to step (b), the second client obtaining from the fourth server the address of the first server, the first client using the address of the first server to establish the Internet connection between the first client and the first server.

10. The method of claim 3, wherein the fourth server issues a command to the first client, the command being a software update command, the first client receiving the software update command and loading software onto the first client from the fourth server, the first client thereafter executing the software.

11. The method of claim 3, wherein the fourth server issues a command to the first client, the command being a reboot command, the first client receiving the reboot command and then rebooting itself.

12. The method of claim 3, wherein the fourth server issues a command to the first client, the command being a getfile command, the first client obtaining information specified by the getfile command via the Internet, the information thereafter being stored on the first client.

13. The method of claim 3, wherein the first client maintains a local log file, the first client storing a plurality of performance-parameter values in the local log file during a period of time when there is no communication between the first client and the fourth server, the performance-parameter values in the local log file being sent to the fourth server after the period of time.

14. The method of claim 3, wherein the fourth server sends commands to the first client and to the second client, the fourth server maintaining a list of commands that have been sent to clients.

15. The method of claim 3, further comprising:

d. the fourth server sending a command to the first client in response to the sending of the performance-parameter value in (c); and e. the first client receiving the command and sending a confirmation of receiving the command to the fourth server.

16. The method of claim 15, wherein the confirmation includes a command ID, the method further comprising:

f. the fourth server maintaining a list of pending commands, the command ID being stored in the list.

17. A method of measuring performance characteristics of an Internet connection between a client and an Internet site, the method comprising:

a. contacting a server;

b. receiving, from the server, link information indicative of an address to the Internet site;

c. using the link information to establish an Internet connection between the client and the Internet site, the Internet connection involving a local dial-up connection from the client to the Internet;

d. accessing the Internet site from the client via the Internet connection and obtaining a performance-parameter value indicative of the performance characteristics of the Internet connection, an application program being used by the client to access the Internet site, the application program not being operated by an individual human user but rather being operated by software resident on the client; and e. sending the performance-parameter value from the client to the server, the performance-parameter value being taken from the group consisting of: full-page download time, and full-page size.

18. The method of claim 17, wherein the application program is web browser.

19. A computer-readable medium having computer-executable instructions for performing steps comprising:

a. contacting a server;

b. receiving, from the server, link information indicative of an address to an Internet site;

c. using the link information to establish an Internet connection between a client and the Internet site, the Internet connection involving a local dial-up connection from the client to the Internet;

d. accessing the Internet site from the client via the Internet connection and obtaining a performance-parameter value indicative of a performance characteristic of the Internet connection, an application program being used by the client to access the Internet site, the application program not being operated by an individual human user but rather being operated by software resident on the client; and e. sending the performance-parameter value from the client to the server, the performance-parameter value being taken from the group consisting of: full-page download time, full-page size.

20. A computer-readable medium having computer-executable instructions for performing steps comprising:

a. receiving on a server a communication from a first client;

b. supplying to the first client link information indicative of an address to an Internet site;

c. receiving on the server a communication from a second client;

d. supplying to the second client link information indicative of the address to the Internet site;

e. receiving on the server from the first client a first performance-parameter value indicative of a performance characteristic of a first Internet connection from the first client to the Internet site, the first Internet connection involving a dial-up connection from the first client to the Internet;

f. receiving on the server from the second client a second performance-parameter value indicative of a performance characteristic of a second Internet connection from the second client to the Internet site, the second Internet connection involving a dial-up connection from the second client to the Internet; and g. storing the first and second performance-parameter values, the first and second performance-parameter values being taken from the group consisting of: full-page download time, full-page size.

21. The computer-readable medium of claim 20, wherein the performance-parameter values are stored on the server.

22. A computer-readable medium having stored thereon:

a. a plurality of first data fields, each of the first data fields containing data indicative of an address of a different target site;

b. a plurality of second data fields, each of the second data fields containing data indicative of a different local Internet service provider telephone number;

c. a plurality of third data fields, each of the third data fields containing data indicative of a password, there being one third data field for each of the second data fields;

d. a plurality of fourth data fields, each of the fourth data fields containing data indicative of a performance-parameter value, each performance-parameter value being obtained by accessing one of the target sites via one of the Internet service provider telephone numbers; and e. a plurality of fifth data fields, each of the fifth data fields containing data indicative of a time associated with a performance-parameter value, there being one fifth data field for each of the fourth data fields.

23. A system, comprising:

a. a first computer connected to the Internet;

b. second computer that receives from the first computer information identifying a target site to access, the second computer being connected to the Internet via a first connection, the second computer accessing the target site and obtaining a first performance-parameter value indicative of a performance characteristic of an Internet connection between the second computer and the target site; and c. a third computer that receives from the first computer the information identifying the target site, the third computer being connected to the Internet via a second connection, the third computer accessing the target site obtaining a second performance-parameter value indicative of a performance characteristic of an Internet connection between the third computer and the target site, the third computer being disposed more than 500 miles away from the second computer, the first and second performance-parameter values being taken from the group consisting of: full-page download time, full-page size.

24. The system of claim 23, wherein the second computer transmits the first performance-parameter value to the first computer via the Internet, and wherein the third computer transmits the second performance-parameter value to the first computer via the Internet.

25. The system of claim 23, wherein the first connection is taken from the group consisting of: a fiber optic connection, a cable TV connection, a satellite connection, and wherein the second connection is taken from the group consisting of: a fiber optic connection, a cable TV connection, a satellite connection.

26. A method, comprising:

establishing a first local connection to a first Internet service provider server so that a first Internet connection is established via the first Internet service provider server to a target server;

obtaining a first performance-parameter value indicative of a performance characteristic of the first Internet connection and communicating the first performance-parameter value to a monitor server via the Internet;

establishing a second local connection to a second Internet service provider server so that a second Internet connection is established via the second Internet service provider server to the target server, the first and second Internet service provider servers being disposed within 500 miles of one another, the target server being disposed more than 500 miles from the first Internet service provider server and from the second Internet service provider server;

obtaining a second performance-parameter value indicative of a performance characteristic of the second Internet connection and communicating the second performance-parameter value to the monitor server via the Internet; and comparing the first and second performance-parameter values to obtain information indicative of whether a degraded performance of the first Internet connection is due to a degraded performance of the first Internet service provider server.

27. A method, comprising:

a. establishing a first local connection to a first Internet service provider server so that a first Internet connection is established via the first Internet service provider server to a target server;

b. obtaining a first performance-parameter value indicative of a performance characteristic of the first Internet connection and communicating the first performance-parameter value to a monitor server via the Internet;

c. establishing a second local connection to a second Internet service provider server so that a second Internet connection is established via the second Internet service provider server to the target site, the first and second Internet service provider servers being disposed within 500 miles of one another, the target server being disposed more than 500 miles from the first Internet service provider server and from the second Internet service provider server;

d. obtaining a second performance-parameter value indicative of a performance characteristic of the second Internet connection and communicating the second performance-parameter value to the monitor server via the Internet;

e. establishing a third local connection to a third Internet service provider server so that a third Internet connection is established via the third Internet service provider server to the target server;

f. obtaining a third performance-parameter value indicative of a performance characteristic of the third Internet connection and communicating the third performance-parameter value to the monitor server via the Internet;

g. establishing a fourth local connection to a fourth Internet service provider server so that a fourth Internet connection is established via the fourth Internet service provider server to the target server, the third and fourth Internet service provider servers being disposed within 500 miles of one another, the target server being disposed more than 500 miles from the third Internet service provider server and from the fourth Internet service provider server;

h. obtaining a fourth performance-parameter value indicative of a performance characteristic of the fourth Internet connection and communicating the fourth performance-parameter value to the monitor server via the Internet; and i. comparing the first, second, third and fourth performance-parameter values to obtain information indicative of whether a degraded performance of the first Internet connection is due to a degraded performance of a connection between the first Internet service provider server and the target server.

* * * * *